Oct. 20, 1925.
J. P. VAN ZANDT
1,558,317
MEANS AND METHOD OF POSITION FINDING BY ASTRONOMICAL OBSERVATION
Filed June 3, 1921     4 Sheets-Sheet 4
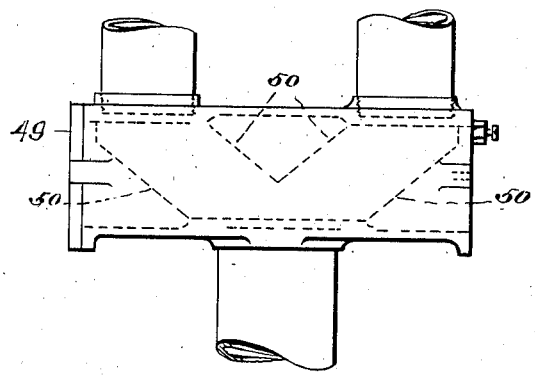
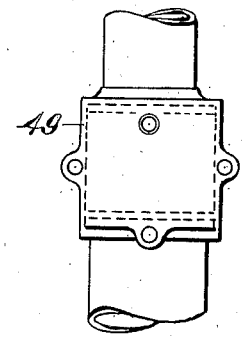
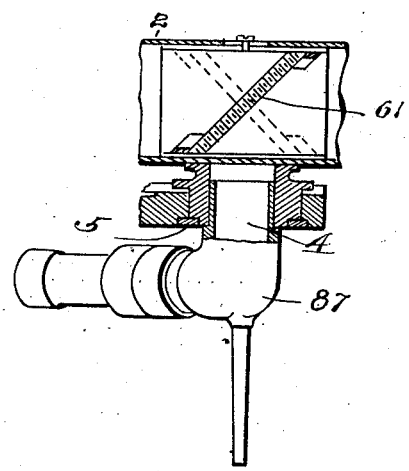
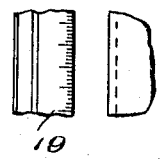
Inventor
John Parker Van Zandt
By Robert H. Young    Attorney Patented Oct. 20, 1925.

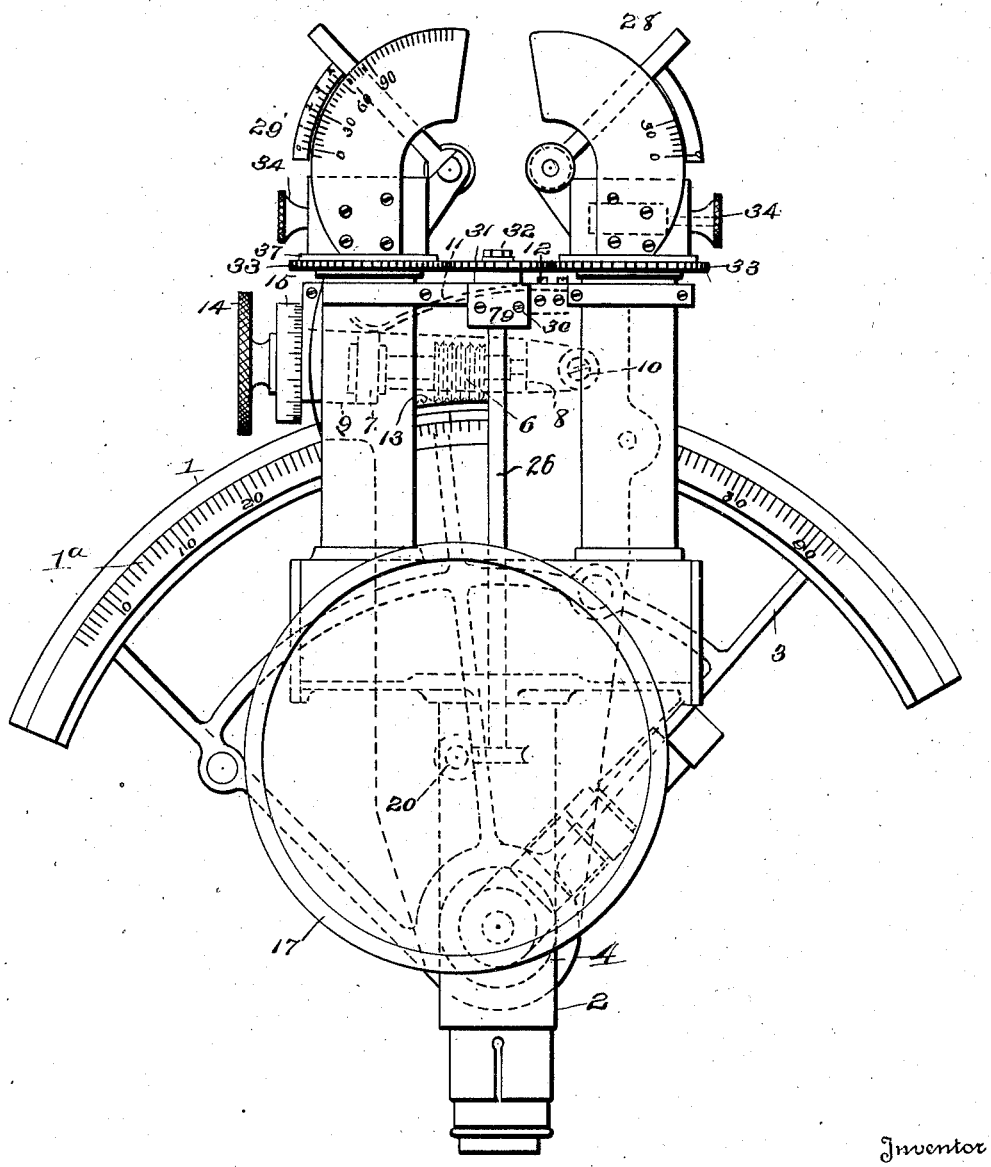

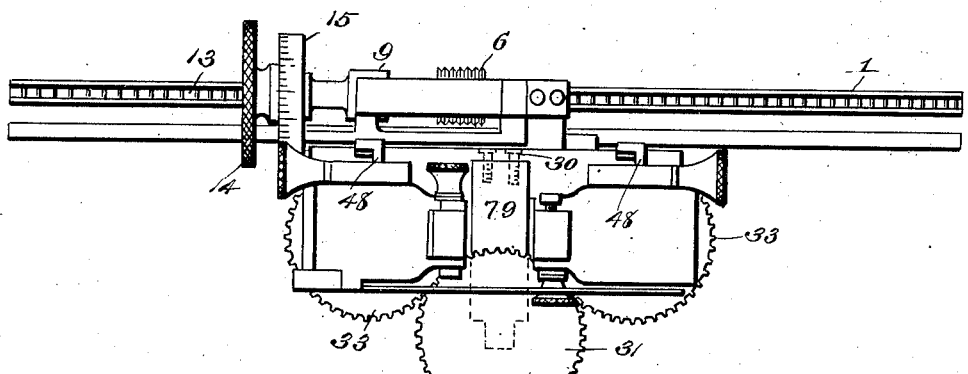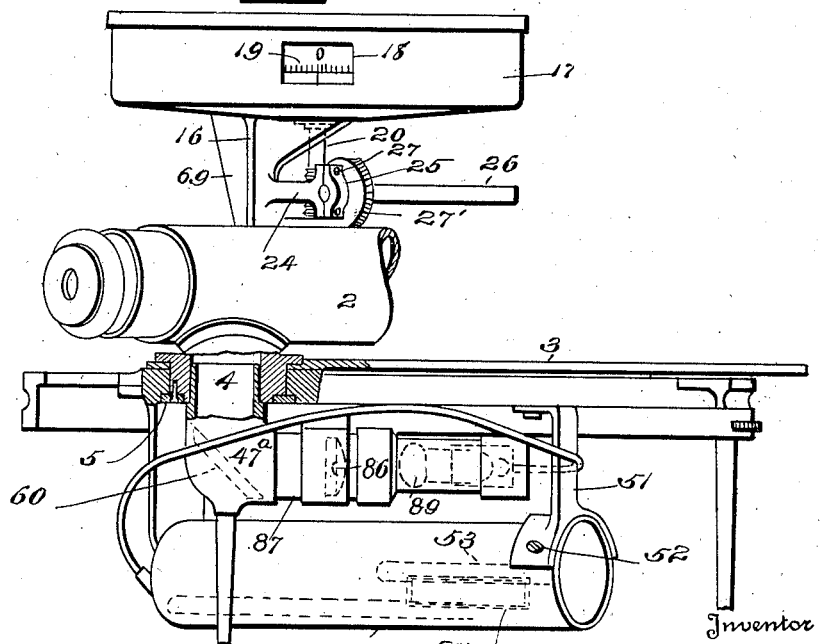

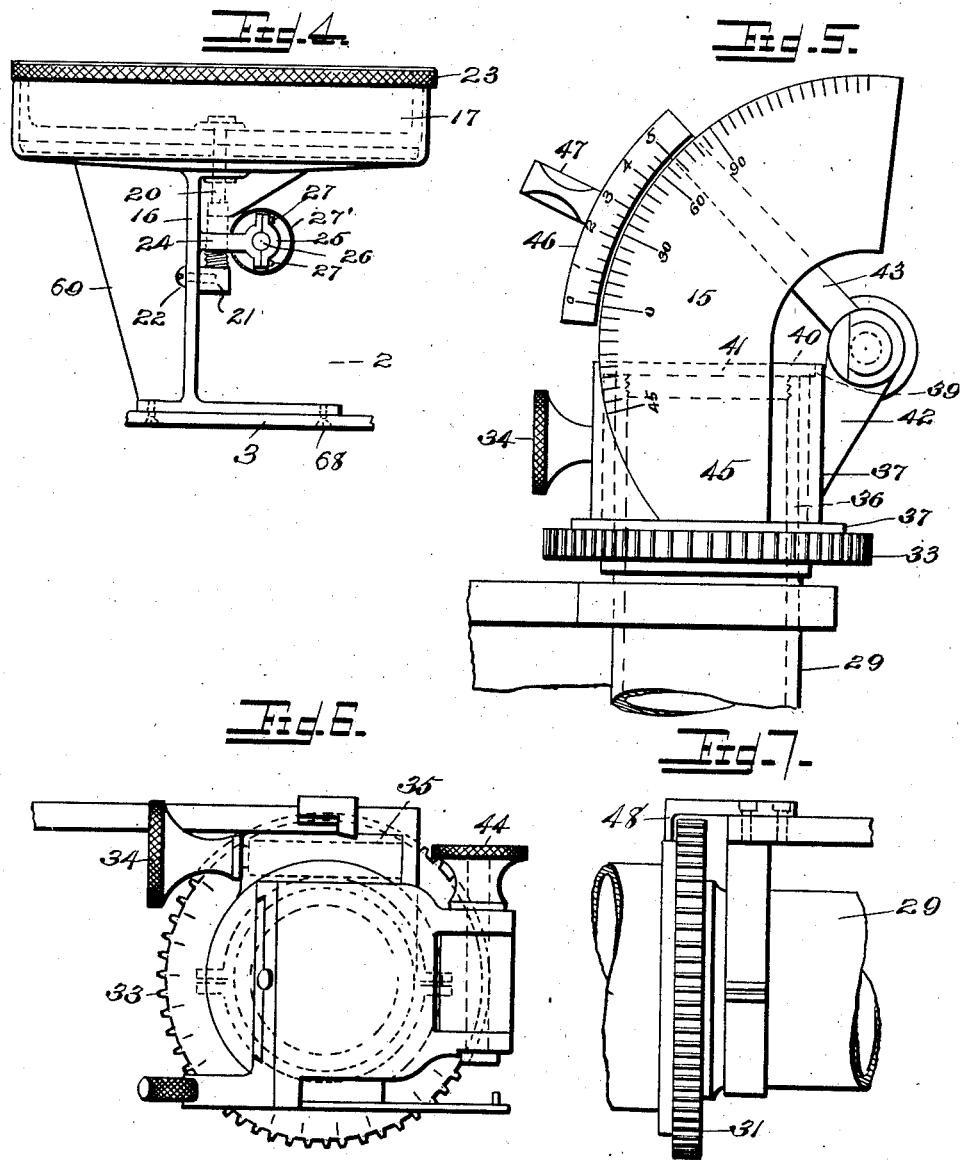

1,558,317

UNITED STATES PATENT OFFICE.

JOHN PARKER VAN ZANDT, OF WASHINGTON, DISTRICT OF COLUMBIA.

MEANS AND METHOD OF POSITION FINDING BY ASTRONOMICAL OBSERVATION.

Application filed June 3, 1921. Serial No. 474,794.

*To all whom it may concern:*

Be it known that I, JOHN PARKER VAN ZANDT, a citizen of the United States, residing at Washington, in the District of Columbia, have invented certain new and useful Improvements in Means and Methods of Position Finding by Astronomical Observation, of which the following is a specification.

This invention relates to a method of determination of position on an airplane, airship, vessel, vehicle, or in the mountains, plains, or wherever such a method can be used and has for its purpose, among others, to construct an apparatus which may serve to determine a reference line parallel to the earth's axis and a plane normal to this reference line which is consequently parallel to the plane of the celestial equator and to measure the angular position of the celestial object, or objects, under observation with respect to this established reference line and plane. The reference line and plane may be determined wholly from the simultaneous observation of two celestial objects; it may be determined by the observation of one celestial object in conjunction with a north indicating mechanism or it may be determined by the observation of one celestial object when any one, or more, of the three factors—latitude, longitude, direction of geographical north—are known. In any case the angle of inclination of reference line, parallel to the earth's axis, to the horizon affords an indication of the latitude; the angular rotation of a mirror or mirrors about the reference plane, parallel to the plane of the celestial equator, affords an indication of the local sidereal time from which with the aid of a suitably adjusted chronometer, the longitude may be deduced; the direction in which the reference line points affords an indication of the direction of geographical north.

My idea is to provide means for establishing a horizon and a reference line or plane which is the plane of the great circle containing the zenith, formed by the extension of the terrestrial meridian of the observer. A collimator held parallel to this reference plane is sighted at such an angle that its axis lies parallel to the north-south axis of the earth. Its angular elevation above the horizon is then an indication of the latitude of the place of observation. A plane normal to the axis of the collimator is then parallel to the plane of the celestial equator. By properly adjusting a mirror or mirrors or suitable reflecting system which may be rotated about the axis of the collimator, it is possible to observe the angular position of the celestial body or bodies with respect to the reference line and plane. By this means an indication of local sidereal time is obtained, which when compared with a chronometer adjusted to show Greenwich sidereal time, gives a ready means of determining longitude. The collimator may be pointed at the proper elevation and in the proper direction when the direction of geographical north and the latitude are known and it is one of the objects of the present invention to provide a simple means of determining the longitude or latitude, when the latitude or longitude, respectively, and the direction of north are already known.

When the latitude is not known but the direction of true north is known it is possible to readily determine the latitude and longitude by the observation of a single celestial body and it is one of the objects of the present invention to provide a simple and ready means for this determination.

When the latitude, longitude and direction of true north are all unknown it is still possible to readily determine any one or all three, provided there are two celestial objects visible and it is one of the objects of the present invention to provide a means for this determination.

Heretofore there have been many drawbacks to position finding and navigation by astronomical observations. During the day, in general there is visible only one celestial object, namely, the sun. A means to simultaneously record the bearing and altitude of this object, together with a chronometer reading, would furnish sufficient data with which to deduce the position of the observer. It has, however, been difficult to obtain the bearing with sufficient accuracy. One of the objects of the present invention is to supply a method for obtaining the angular position of the sun or any other celestial object when observed alone.

Heretofore it has been necessary to undertake involved or laborious computations or to consult special tables not perfectly clear to one not skilled in the art, in order to deduce latitude or longitude, or both, after the bearing and altitude of the celestial object has been observed. One of the objects of the present invention is to eliminate this laborious computation by the measurement of related angles other than those usually observed and much more simply connected with the latitude and longitude, thus shortening the time required to determine position and at the same time making the operation simple enough to be within the ready use of those not skilled in navigational matters.

Heretofore when two or more celestial objects have been visible, it has been the custom to observe the altitude of each as near simultaneously as possible and to deduce the latitude and longitude from the resulting observations by the usual involved computations or by reference to specially constructed charts, tables, or slide rules. One of the objects of the present invention is to eliminate the necessity for these involved computations. Another object is to make possible a truly simultaneous observation of two celestial bodies.

A further object of the present invention is to provide a means for determining the local sidereal time which it is possible to read directly from the instrument when it is properly adjusted. If there is at hand a chronometer adjusted to show the Greenwich sidereal time, the difference in the two readings gives at once the longitude of the observer.

A further object of the invention consists in a method for determining the direction of geographical north by simultaneous reference to any two or more selected astronomical bodies.

The uses of the method of position finding which constitutes this invention are so manifold, it must be understood that the method is in no way limited to the embodiment herein described and illustrated in the accompanying drawings. It is evident that such a universal and simple method of position finding can be of great value to explorers, mountaineers, surveyors, reconnaissance parties, &c. For such purposes an instrument of the general type herein described may be used in conjunction with a light tripod; an horizon may be obtained by use of a plumb-bob or weight, spirit level or any other available means. When used in connection with a north indicating mechanism for the determination of position by the observation of a single celestial body it may be desired to materially alter the particular embodiment herein represented. It is to be noted that it is possible to employ the instrument herein shown as an ordinary aerial sextant without any alteration whatsoever.

Other objects of the present invention and the features of construction by which they are attained will be hereinafter set forth in conjunction with one of the possible embodiments of the invention which is described in the accompanying specification and included in the claims, and disclosed in the accompanying drawings, in which:

Figure 1 is a side elevation of an instrument which embodies the principles covered in this specification. The collimator system is here shown at an elevation of 45° to the horizon;

Figure 2 is a plan view of the same showing diagrammatically the quadrant and arrangement of mirrors and mirror gears which rotate about the axes of the collimators;

Figure 3 is an end view showing handle and battery, level bubble, telescope supporting frame, part of main collimator dial, dial window and gearing;

Figure 4 is a detail of the dial housing and gears;

Figure 5 is a double size side elevation of the mirrors and declination scale;

Figure 6 is a plan view of the device shown in Figure 5;

Figure 7 is a side elevation of a portion of the collimator and the marker;

Figure 8 is a side elevation of the assembly of the prisms which collect the light reflected from the two rotating mirrors and direct it to the eye-piece;

Figure 9 is an end elevation of the prism holding means;

Figure 10 is a partial sectional view of the main collimator showing the unsilvered mirror which reflects the image of the level bubble into the eye-piece; and Figure 11 is a developed section of the dial scale for a four-minute length; one revolution of the dial turns the mirror gears through $\frac{1}{24}$ of a complete circle. Hence, each revolution of the dial represents $\frac{1}{24}$ of a sidereal way or one sidereal hour.

Referring in detail to the drawings with particular reference first to Figures 1, 3 and 4, a quadrant 1 carries a scale 1ª graduated in degrees from 0°–90°. A telescope system 2 is rigidly mounted on a telescope supporting frame or plate 3 and pivots with it about the bearing journal 4, which is held in the quadrant by retaining ring 5.

The telescope system is moved up and down the scale of the quadrant by means of a micrometer worm 6 (see Figs. 1 and 2) which is carried by bearings 7 and 8 in bracket 9. Bracket 9 is pivotally secured to the frame 3 by pin 10 and is normally pressed downwardly against the quadrant teeth by one end of the leaf spring 11. The other end of spring 11 is fixedly secured by pins 12 to a portion of the telescope system frame.

The worm 6 is adapted to engage teeth 13 of the rack of quadrant, and is adapted to be rotated by movement of the knob 14. In the embodiment herein shown one revolution of the knob 14 rotates the telescope system about the journal 4 through an angular distance of one degree, or one tooth or graduation on the quadrant. On the worm assembly, adjacent to the knob 14 there is provided a vernier 15 which is graduated to read in minutes.

By lifting the knob 14 against the tension of the spring 11 the worm may be lifted clear of the teeth 13 to facilitate rapid moving for an approximate setting.

As shown in Figs. 1, 2, 3 and 4, a frame 16 is rigidly secured to the frame 3 by means of pins 68. The main portion of this frame is braced by webbing 69. At the other end of frame 16 a dial housing 17 is eccentrically mounted. The dial housing is provided with a sight opening 18 to provide for taking readings of the dial 19.

Dial 19 is centrally disposed within housing 17 and is suitably mounted on a worm shaft 20 which in turn bears in a centrally disposed bearing in the base of the housing, and a bearing bracket 21 secured by screw 22 to frame 16. The outer portion of the dial is designed with a roughened surface as shown at 23 to provide means for gripping the dial for rotation.

A bracket 24 is provided on the frame 16. This bracket is provided with a bearing 25 which is adapted to receive the inner end of shaft 26. The bearing portion of this bracket is made in two sections which are secured together by means of screws 27.

Shaft 26 is provided with a gear 27' adapted to mesh with the worm of worm shaft 20, so that any rotation of the dial will be transmitted therethrough to the mirror system 28. A bearing plate 79, secured to frame 3 by pins 30, is adapted to receive the outer end of shaft 26 to which there is rigidly secured a driving gear 31 held against endwise movement on the shaft by nut 32.

The mirrors 28, as will be subsequently described, are mounted on suitable collars surrounding the collimators and are turned about the axis of the collimators 29 by the annular spur gears 33 which bear a one to one ratio with the driving gear 31, and which are suitably mounted on collar 37 of the collimator. The mirror system can be loosened from the spur gear system by the mirror system clamp nut 34. When it is desired to clamp the mirror system to the spur gear system the mirror clamp nut 34 is turned to tighten the clamping stud 35 (see Figs. 5 and 6) which is beveled to set up against the contour of the spur gear system collar 36.

The spur gear system collar 36, rigidly attached to the spur gear has a portion extending upwardly therefrom around the collimator and a mirror system collar 37 is mounted thereupon. This last named collar is provided in its outer end with an incut shoulder or recess at 39 to seat the retaining ring 40 which is adapted to screwthreadedly engage the outer end of the collimator to maintain the objective 41, the collar 37 and the collar 36 in position.

The collar 37 is provided with a bracket 42 which has a portion adapted to provide a pivotal mounting for the mirror 43. As shown in Fig. 6 the mirror frame is adapted to be fixed in any desired position by set screw 44.

A declination scale 45, graduated with markings as small as 5 degrees from 45 to 90 degrees, is fixedly secured by screws to the mirror system collar.

A vernier 46 with the usual release setting handle 47 is provided for taking readings as small as 20 minutes.

In Figure 5 the mirror 43 is shown set at an angle of 45° to the celestial equator, which is the angle at which it must be set in order to reflect the image of a celestial object on the celestial equator directly into the telescope 2 with the axis of the collimator. The declination of an object on the celestial equator is zero, which is the reading shown on the drawing as set on the declination scale by reference to vernier 46.

The mirror system is free to revolve (about the axis of the collimator) until locked in the desired position, by means of mirror clamping nut 34. There are two reference marks carried by marker 48, one of which is placed opposite the reference mark carried by the mirrors 28 and one is used to indicate the rotation of the spur gear.

It will of course, be understood that the preceding description as to the detail of the spur gear system and mirror system will be identical for the two branches into which the collimator is to be divided. A detail of the construction of the main collimator and its two branches is shown in Fig. 8 in which 49 represents the prism frame and 50 indicates the silvered faces of the prisms. An end view of the frame is shown in Figure 9.

An artificial horizon bubble 86 is enclosed in a tube 87 whose axis is held permanently fixed to the quadrant by the projecting lug 47ª. In the tube above the bubble there is a detachable electric light 89 for use in establishing a horizon, when observations are being taken at night.

The handle 50 which is secured to the quadrant by bracket 51 and pins 52, is wooden and is bored to carry a small battery 53. The switch 54 affords contact for lighting the level bubble light.

At the base of the tube 87 there is provided a silver mirror 60 which is set at an angle of 45 degrees to direct the reflection in the bubble into the telescope. In Fig. 10 it will be noted that an unsilvered mirror 61 is provided to receive the reflection of this bubble and direct the same to the eye of the observer, at the same time permitting the reflection of the celestial objects from the main collimator system to reach the eye of the observer.

Having briefly described the character of the instrument represented in the accompanying figures, the operation of the instrument may be briefly considered for the case when the latitude, longitude and direction of geographical north are all three unknown and there are two celestial objects visible.

Set the declination of the celestial body with the greater right ascension on the first mirror and the declination of the other celestial object on the second mirror. The mirror and scale are so arranged that when the declination of a celestial body is set on the declination scale the mirror is inclined to the axis of the collimator at an angle equal to half the polar distance of the celestial object.

The mirror gears 33 are adjusted so that when the dial 19 reads zero minutes the zero (or 24th) hour division on the gear may appear opposite the reference mark 48. The first mirror is clamped to the gear collar by the clamping nut 34 and its reference mark set opposite its respective mark on 48. In this position the plane of the mirror is perpendicular to the reference plane formed by the extension of the observer's terrestrial meridian and faces upward to a point on the celestial meridian determined by the setting of the declination scale. The direction of the rotation of the mirror about the collimator axis is the same as the direction of the apparent rotation of the celestial objects about the observer, namely, anti clockwise as viewed by the eyepiece.

The dial 19 is now turned until the hour divisions on the mirror gears and minute divisions on the dial correspond to the difference in right ascension between the two celestial objects under observation. The second mirror is now clamped by its clamping nut 34 with its reference mark set opposite its respective mark on 48. The two mirrors have now been separated by an angular distance equal to the difference in right ascension of the two celestial objects under observation and they may now be turned as a unit by turning dial 19.

The dial is now turned until the mirrors come opposite the celestial objects under observation thus bringing the images of the two celestial objects simultaneously on the cross hair in the eye-piece, while at the same time the bubble is accurately centered. When these conditions obtain the inclination of the telescope to the horizon as read on scale 1ª gives the latitude; the telescope points north, parallel to the earth's axis. The hours and minutes shown by the setting of the mirror gears and dial respectively gives a value which when subtracted from the greater right ascension results in the local sidereal time of observation (or 24 hours minus the local sidereal time as the case may be). When the local sidereal time is subtracted from the Greenwich sidereal time as indicated by a chronometer the value of the longitude is obtained.

The operation may also be briefly considered for the case when the latitude and longitude are both unknown but the direction of geographical north is known, and there is one celestial object visible.

Set the declination of the celestial object on either mirror. (Only one of the two rotating mirrors will be necessary in this case.) The dial is set to zero and the mirror gears reference mark set to zero as the preceding problem.

The collimator is now righted in the direction of geographical north and changed in elevation to the horizon in a search for the latitude of the place of observation while the dial is turned until the mirror comes opposite the celestial object under observation, bringing the image of the object on the cross hair in the eye-piece at the same time that the bubble is accurately centered. When these conditions obtain the inclination of the telescope to the horizon indicates the latitude; the hours and minutes shown by the setting of the mirror gears and dial respectively gives a value which when combined with the right ascension of the object, having due regard to signs, results in the local sidereal time. When the local sideral time is subtracted from the Greenwich sidereal time as indicated by a chronometer the value of the longitude is obtained.

It is at once apparent, without a detailed description of the operation, how, if any one of the other factors, latitude or longitude, is known the observation of one celestial body gives directly the other unknown factors. All that is necessary is a knowledge of the declination and right ascension of the celestial object, as found in an almanac and a chronometer adjusted to Greenwich time; with these and by the means and method herein described the latitude or longitude or direction of geographical north or all three are readily determinable.

What I claim is:

1. In a position finding device, means for observing two celestial objects simultaneously and bringing their images into coincidence, said means comprising a telescope system with two objectives and two collimators, and means mounted on each of said collimators capable of rotation in a plane perpendicular to the axis of the collimator, and also capable of rotation in a second plane perpendicular to said first named plane, and suitable scales for indicating the degree of both rotations, and means for setting said first named means against either or both rotations.

2. In a position finding device, means for observing two celestial objects simultaneously and bringing their images into coincidence, said means comprising a telescope system with two objectives and two collimators, and means mounted on each of said collimators capable of rotation in a plane perpendicular to the axis of the collimator, and also capable of rotation in a second plane perpendicular to said first named plane, and suitable scales for indicating the degree of both rotations, and means for rotating said first named means around said collimator axis.

3. In a position finding device, means for observing two celestial objects simultaneously and bringing their images into coincidence, said means comprising a telescope system with two objectives and two collimators, and means mounted on each of said collimators capable of rotation in a plane perpendicular to the axis of the collimator, and also capable of rotation in a second plane perpendicular to said first named plane, and suitable scales for indicating the degree of both rotations, and means for rotating said first named means around said collimator axis, and means for setting the two means mounted on the two said collimators against relative rotation one to the other in the plane perpendicular to their axes.

4. In a position finding device, means for observing two celestial objects simultaneously and bringing their images into coincidence, said means comprising a rotatably mounted telescope system with two objectives and two collimators, and a mirror system mounted on each of said collimators capable of rotation in a plane perpendicular to the axis of the collimator, and also capable of rotation in a second plane perpendicular to said first named plane, and suitable scales for indicating the degree of rotation of the telescope system and of the rotations of the mirror systems in both of the planes in which they rotate.

5. In a position finding device, means for observing two celestial objects simultaneously and bringing their images into coincidence, said means comprising a rotatably mounted telescope system with two objectives and two collimators, and a mirror system mounted on each of said collimators capable of rotation in a plane perpendicular to the axis of the collimator, and also capable of rotation in a second plane perpendicular to said first named plane, suitable scales for indicating the degree of rotation of the telescope system and of the rotations of the mirror systems in both of the planes in which they rotate, and means for setting said first named means against either or both rotations.

6. In a position finding device, means for observing two celestial objects simultaneously and bringing their images into coincidence, said means comprising a rotatably mounted telescope system with two objectives and two collimators, and a mirror system mounted on each of said collimators capable of rotation in a plane perpendicular to the axis of the collimator, and also capable of rotation in a second plane perpendicular to said first named plane, suitable scales for indicating the degree of rotation of the telescope system and of the rotations of the mirror systems in both of the planes in which they rotate, and means for rotating said first named means around said collimator axis.

7. In a position finding device, means for observing two celestial objects simultaneously and bringing their images into coincidence, said means comprising a telescope system with two objectives and two collimators, and means mounted on each of said collimators capable of rotation in a plane perpendicular to the axis of the collimator, and also capable of rotation in a second plane perpendicular to said first named plane, suitable scales for indicating the degree of rotation of the telescope system and of the rotations of the mirror systems in both of the planes in which they rotate, means for rotating said first named means around said collimator axis, and means for setting the two means mounted on the two said collimators against relative rotation one to the other in the plane perpendicular to their axes.

8. A position finding device, means for observing two celestial objects simultaneously and bringing their images into coincidence, said means comprising in combination a telescope system provided with two objectives, a plurality of mirrors mounted on said telescope system, one or more of which is adapted to be rotated in a plane perpendicular to the axis of the collimator, both of said mirrors being adapted to be rotated in the plane perpendicular to said first mentioned plane for the purpose described, and suitable scales for indicating the degree of rotation of the mirror system in both of said planes.

9. A position finding device comprising a quadrant, a telescope system rotatably mounted on said quadrant, said telescope system being provided with two objectives, two mirrors mounted on said telescope system and capable of rotation relative to each other in a plane perpendicular to the axis of the collimator, both of said mirrors being adapted to be rotated in the plane perpendicular to said first mentioned plane for the purpose described and means visibly establishing an apparent and artificial horizon in the eye-piece of the telescope system.

10. A position finding device comprising in combination a telescope system rotatably mounted on a quadrant, said telescope being substantially Y-shaped to provide two collimators for the purpose described, said telescope system being provided on each of its collimator branches with a mirror, one or both of said mirrors being capable of rotation relative to each other in a plane perpendicular to the axis of the collimator, both of said mirrors being adapted to be rotated in a plane perpendicular to the plane of said first mentioned plane for the purpose described and means visibly establishing an apparent and artificial horizon in the eye-piece of the telescope system.

11. A position finding device comprising in combination a quadrant, a telescope system rotatably mounted thereon, said telescope system being substantially Y-shape to provide two collimators and objectives, a mirror system collar mounted on each of said collimators and adapted to be rotated about the axis of the collimator, a mirror in each of said mirror systems adapted to be rotated in a plane perpendicular to the plane of rotation of said mirror system collar and means visibly establishing an apparent and artificial horizon in the eye-piece of the telescope system.

12. A position finding device comprising in combination a quadrant, a telescope system rotatably mounted thereon, said telescope system being substantially Y-shape to provide two collimators and objectives, a mirror system collar mounted on each of said collimators and adapted to be rotated about the axis of the collimator, a mirror in each of said mirror systems adapted to be rotated in a plane perpendicular to the plane of rotation of said mirror system collar, and suitable scales for indicating the degree of rotation of the telescope system, the mirror system collar and the mirrors themselves and means visibly establishing an apparent and artificial horizon in the eye-piece of the telescope system.

13. A position finding device comprising in combination a quadrant, a telescope system rotatably mounted thereon, said telescope system being substantially Y-shaped to provide two collimators and objectives, a mirror system collar mounted on each of said collimators and adapted to be rotated about the axis of the collimator, a mirror in each of said mirror systems adapted to be rotated in a plane perpendicular to the plane of rotation of said mirror system collar, and suitable scales for indicating the degree of rotation of the telescope system, the mirror system collar and the mirrors themselves, and means for establishing an artificial horizon.

14. A position finding device comprising in combination a quadrant, a telescope system rotatably mounted thereon, said telescope system being substantially Y-shape to provide two collimators and objectives, a mirror system collar mounted on each of said collimators and adapted to be rotated about the axis of the collimator, a mirror in each of said mirror systems adapted to be rotated in a plane perpendicular to the plane of rotation of said mirror system collar, and suitable scales for indicating the degree of rotation of the telescope system, the mirror system collar and the mirrors themselves, and means including illuminating means and reflecting means for establishing an artificial horizon visible in the eyepiece of said telescope system.

15. A position finding device comprising in combination a quadrant, a telescope system rotatably mounted thereon, said telescope system being substantially Y-shape to provide two collimators and objectives, a mirror system collar mounted on each of said collimators and adapted to be rotated about the axis of the collimator, a mirror in each of said mirror systems adapted to be rotated in a plane perpendicular to the plane of rotation of said mirror system collar, and suitable scales for indicating the degree of rotation of the telescope system, the mirror system collar and the mirrors themselves, and means for establishing an artificial horizon, said last named means including a level bubble, illuminating means, and means for reflecting the image of said level bubble into the eyepiece of the telescope system.

16. A position finding device comprising in combination a telescope system provided with two collimators and two objectives, two mirrors mounted on said telescope system and capable of rotation relative to each other in a plane perpendicular to the axis of the collimator, both of said mirrors being adapted to be rotated in the plane perpendicular to said first mentioned plane for the purpose described, and means for establishing an artificial horizon and means for determining the angle of the telescope system to the true vertical.

In testimony whereof I affix my signature.

JOHN PARKER VAN ZANDT.